United States Patent [19]
Block et al.

[11] 3,865,745
[45] Feb. 11, 1975

[54] PROCESS FOR THE PREPARATION OF METAL CARBIDE AND METAL OXIDE MICROSPHERES

[75] Inventors: Jacob Block, Rockville; Richard J. Herbst, Ellicott City; Leonard V. Triggiani, Rockville, all of Md.

[73] Assignee: W. P. Grace & Co., New York, N.Y.

[22] Filed: Sept. 1, 1972

[21] Appl. No.: 285,942

Related U.S. Application Data

[62] Division of Ser. No. 106,879, Jan. 15, 1971, abandoned.

[52] U.S. Cl. ............... 252/301.1 R, 264/.5, 264/65, 264/82, 423/256, 423/440
[51] Int. Cl. ............................................ C01g 43/00
[58] Field of Search ............ 264/65, 66, 82, 29, 44, 264/.5; 423/6, 70, 225, 256, 440; 106/44, 45; 252/301.1 R, 448

[56] References Cited
UNITED STATES PATENTS

| | | | |
|---|---|---|---|
| 3,153,636 | 10/1964 | Shanta et al. | 264/29 |
| 3,438,749 | 4/1969 | Lonadier et al. | 264/65 |

*Primary Examiner*—Jeffrey R. Thurlow
*Attorney, Agent, or Firm*—Joseph P. Nigon

[57] ABSTRACT

A process for preparing metal carbide microspheres, and metal carbide microspheres containing excess carbon, from ion exchange resins in which the carbon-to-metal ratio in the product is controlled by heating in the presence of steam or other oxidizing gas after first heating the metal exchanged resin beads in an atmosphere of hydrogen and steam to remove sulfur.

8 Claims, No Drawings

PROCESS FOR THE PREPARATION OF METAL CARBIDE AND METAL OXIDE MICROSPHERES

This is a division, of application Ser. No. 106,879 filed Jan. 15, 1971, now abandoned.

Ion exchange resins are commercially available in two forms. The cation exchange resins have exchange activity associated with aromatic sulfonic, methylene sulfonic, carboxylic acid, phosphonic acid, and phenolic groups. One of the most common of these resins is prepared by sulfonation of synthetic organic base materials. A high capacity aromatic sulfonic acid cation resin has been prepared by sulfonation of a polymer prepared from a mixture of styrene and divinyl benzene with sulfuric acid. Preparation of these styrene divinyl benzene polymer beads and the final sulfonation product are described in detail in the literature.

Another type of cation exchange resin is the carboxylic acid type. These resins are prepared by the reaction of phenol, acrolein, and the semi-amide of oxalic acid. They may also be prepared by direct copolymerization of either methacrylic or acrylic acid with divinyl benzene.

Anion exchange resins are generally formed by polymerization of an aromatic amine and formaldehyde, or polyamine of phenol and formaldehyde. One of the early anion exchange resins was prepared from m-phenylene diamine, polyethylene diamine, and formaldehyde.

A series of resins of varying basicities and porosities may be prepared from an intermediate prepared by the chlormethylation and subsequent amination of the copolymer styrene-divinylbenzene with varying degrees of cross-linking. These materials are well-known commercially available products. They are discussed in great length in the book, "Ion Exchange Resins," by Robert Kunin, John Wiley & Sons, 1958.

This book lists more than 200 cation and anion exchange resins by trade name and gives the type of resin and the capacity of the resin. The trade names assigned to seven of the more typical resins are set out in the table below:

CATION EXCHANGE RESINS

| Name | Type |
|---|---|
| Amberlite IRC-120 | Aromatic sulfonic (styrene base) |
| Amberlite IRC-50 | Carboxylic (acrylic) |
| Dowex 50 | Aromatic sulfonic (styrene base) |
| Dowex 30 | Sulfonated phenolic |

ANION EXCHANGE RESINS

| Amberlite IRA-400 | Quaternary strong base (styrene) |
| Dowex 1 | Quaternary strong base (styrene) |
| Dowex 1 | Quaternary strong base (styrene) |

The ion exchange resins have achieved wide acceptance in industry. They are used in the refining of sugar, the preparation of certain drugs, and in water treatment.

We have found that the carbon-to-metal mole ratio of the product carbide microspheres, prepared as described below, can be controlled within predictable values in the range of 0.01:1 to 15:1 by heating the microspheres to a temperature of 500° to 1,100°C in the presence of steam. If the resin used to prepare the carbide microsphere is one that contains sulfur, this heating is normally carried out after the resin beads have been first heated in a combination of hydrogen and steam to effect sulfur removal.

The first step of our novel process is the selection of a suitable resin. Cation exchange resins and anion exchange resins both give satisfactory results. When sulfonated cation exchange resins are used, the resin is treated after ion exchange to remove sulfur. Carboxylic acid resins do not have to be so treated since there is no sulfur in the resin structure. Anion exchange resins can also be used in preparing certain types of carbides. The anion exchange resin can be exchanged with a suitable anion such as tungstate, for example, and the resin used as a matrix for preparing the carbide.

In the next step of the process, the resin beads selected are treated with a solution of metal ions. Solutions of metal ions such as uranium, thorium, plutonium, titanium, zirconium, hafnium, niobium, molybdenum, tantalum, tungsten, osmium, and thallium may be used for this purpose. The only limitation in the choice of metal is that the salt used be somewhat soluble and ionizable. Chlorides, nitrates, sulfates, etc., give satisfactory results.

Our resin loading process is essentially an ion exchange process and water is the preferred solvent for the metal salt. However, in some systems organic solvents such as methanol, for example, give good results.

The concentration of the salt solution can vary over a wide range. The solution can be infinitely dilute or saturated. The concentration of the salt solution of course depends on the salt being used and the solvents chosen for the preparation. When uranium nitrate hexahydrate is used for example, a solution of 37 grams per liter gives a satisfactory result. When sodium tungstate is exchanged with an anion exchange resin for example, a solution of 50 grams of salt in 3 liters of deionized water is a convenient solution for effecting the exchange.

Another variable is the pH of the system during the exchange step. The exchange can be carried out at any pH that is compatible with the resin and the metal ion. Very low pH values (less than 0) should be avoided because then the hydrogen ion becomes a competitor for exchange sites; high pH values, on the other hand, lead to precipitation of many of the metals.

After the resin is exchanged with a suitable quantity of the desired metal ion and is washed free of excess solution, it is dried using any suitable technique. We have found that good results are obtained when the exchanged resin is dried at a temperature of 50° to 180°C for a period of 8 to 24 hours.

If the resin contains sulfur the next step is desulfurization. The amount of sulfur in a sulfur-containing resin can be reduced to 0.05 percent or less by contacting the resin with a mixture of hydrogen and steam at a temperature from about 400° to 800°C for a period of about 4 to 8 hours.

The next step of the process covers the essential feature of our invention. In this step the carbon content of the final product is reduced by heating the resin spheres to a temperature of 500° to 1100°C in the presence of an oxidizing gas such as steam, carbon dioxide, or oxygen for the proper period of time to achieve the desired carbon-to-metal ratio in the final product. One of the preferred oxidizing gases is steam.

The temperature of heating during this step determines the rate of reaction. If the temperature is below 800°C, the reaction with steam proceeds too slowly to obtain suitable results in a reasonable period of time. However, if the temperature is increased to more than 1100°C, the reaction proceeds too rapidly for proper control.

The time of heating depends on the metal-to-carbon ratio desired in the final product. The carbon content of zirconium-carbon spheres can be reduced to about 1.2 percent, for example, by heating to 900°C for a period of 2 hours and 15 minutes in a sulfur-containing resin that has been previously desulfurized by heating to a temperature of 400° to 800°C for a period of about 7 hours.

A typical cycle includes heating to 400°C over a period of about ½ to 1 hour, followed by increasing the temperature to 800°C over a period of about 1 hour, and then maintaining the temperature at 800°C for 3 hours followed by increasing the temperature to 900°C over a period of about 30 minutes, and maintaining the temperature at 900°C for about 1 to 2 hours.

The next step of the process in the carbothermic reduction if carbides are being prepared. This is generally carried out by heating to a temperature between 1200–1400°C in argon or vacuum for about 3 to 6 hours.

The final step of the process is a sintering step. The physical properties and nature of the product can be controlled by careful control of the sintering step. The sintering is normally carried out at temperatures from about 1000° to 3000°C for a period of about 0.5 to 28 hours. The spherical particles recovered from our process are sintered to densities of from 50 to 100 percent of theoretical at temperatures of 1500° to 3000°C. The sintering is normally carried out in the presence of an inert gas such as argon, for example, or in vacuum. When the spheres are sintered for periods of approximately 5 hours and at temperatures of about 2000°C, the density of the spheres is in the range of 80 to 100 percent of theoretical.

During conversion of the exchange resin beads to the carbide there is obviously some weight loss due to loss of carbon. When the product being prepared is uranium carbide spheres for example, the weight loss is approximately 30 percent. Weight loss increases to about 70 percent when titanium carbide spheres are being prepared. No significant disfiguration of the resin beads or cracking of the beads was observed during the process. The spheres decreased in size by about 30–40 percent during conversion to the carbides.

The carbide particles recovered are generally spherical and the average diameter $\bar{D}$ can be determined with good accuracy by microscopic examination. Alternately, an equivalent spherical diameter $\bar{D}_s$ can be deduced from a measurement of the surface area (m²/g) and density using the expression:

$\bar{D}_s = 6/(\rho \text{ surface area})$ where $\rho =$ true density of the material in g/cm³. A comparison of $\bar{D}$ and $\bar{D}_s$ values of a sample readily indicates the presence of any undesirable irregular structure. The structural factor $\Sigma$ defined below has been used to evaluate structural irregularities. $\Sigma$ is defined as equal to the quantity $(\bar{D}/\bar{D}_s)$. The $\Sigma$ value determined on samples of our product is about one. Accuracy of these measurements was on the order of ± 10 percent.

Although we have described our process as one for the preparation of carbides, the process can also be modified to prepare oxides and nitrides.

The first step in the preparation of oxides is essentially the same as in the process for preparing carbides. The metal-to-carbon ratio in the spheres is reduced to less than about one percent by heating the spheres in an atmosphere of an oxidizing gas, such as steam, carbon dioxide, or oxygen, at a temperature of above 500°, generally 800° to 1100°C for periods of about 3 to 6 hours. After this heating period the metal-to-carbon ratio is reduced substantially and the product contains less than one percent carbon.

The spheres are densified by sintering in a vacuum or in the presence of argon using a cycle very similar to the cycle used in the preparation of carbide spheres with the exception that the final temperature is usually in the range of 1,500° to 2,500°C. The spheres are maintained at temperature for a period of about 1 – 5 hours. The product recovered from this process is an oxide sphere containing greater than 99 percent metal oxide.

When the product to be recovered is the nitride, the processing is essentially the same as with the carbide. The carbon content of the spheres is reduced to a nominal carbon-to-metal ratio of one by heat treatment in an oxidizing gas. Heat treatment is continued using inert gas, hydrogen or vacuum until the metal carbide is formed. The furnace atmosphere is changed to nitrogen or dissociated ammonia and heat treatment is continued further until the metal carbide is converted to the nitride and densification is essentially complete. A typical thermal processing cycle is as follows:

a. To 875°C over a period of 3 ½ hours in steam
b. To 1,300°C over a period of 45 minutes in $H_2$.
c. To 1,500°C over a period of 25 minutes in $N_2$.
d. To 1,750°C over a period of 1 hour and 18 minutes in $N_2$ or Ar.
e. Maintained at 1750°C for a period of 1 hour.

At the end of the sintering cycle the furnace is turned off and the gas is continuously passed over the spheres until cool. The product recovered is essentially pure metal nitride with a metal-to-nitrogen ratio of one. The product contains greater than 99 percent metal nitride.

Our invention is further illustrated by the following specific but nonlimiting examples.

EXAMPLE 1

This example covers the preparation of zirconium carbide microspheres.

A total of 50 grams of an aromatic sulfonic acid type resin on a styrene base (Dowex 50 WX4) was added to a solution of 100 grams of zirconyl chloride ($ZrOCl_2 \cdot 8H_2O$) and 500 ml of water. The pH of the resultant solution was 1.7. The mixture was stirred for 18 hours. The resin was washed free of chloride with deionized water and the spherical resin particles were vacuum dried at a temperature of 60°C. The dried resin beads were separated using a 50-mesh screen, and 149 grams of resin that passed through the screen were transferred to a Vycor reactor designed to have an extra-coarse Vycor frit above and below the sample. Steam was passed through the resin at a rate of 3.7 liters per minute and hydrogen at a rate of 1.5 liters per minute. The sample was heated over the following cycle:

a. Heated to 400°C over a period of 65 minutes.
b. Maintained at 400°C for 60 minutes.
c. Heated to 800°C over a period of 45 minutes.
d. Maintained at 800°C for 4 hours.

After 4 hours the hydrogen flow was discontinued and argon was passed through the resin beads in the reactor at the rate of one liter per minute. The temperature was increased to 900°C over a period of 15 minutes and maintained at 900°C for a period of 2 hours. The material retained its spherical shape and had an average diameter of 33 microns. The product at this stage had the following composition: zirconium — 72.73 percent; carbon — 1.18 percent; and sulfur — <0.05 percent.

It is apparent from these data that the carbon can be removed from metal-loaded resin spheres without destroying their spherical shape.

EXAMPLE 2

This example illustrates the use of our process to prepare carbides using a resin loaded with a mixture of zirconium and uranium.

A total of 7,205 grams of a sulfonic acid cation exchange resin (Ionac CGC-242, containing 58.48 percent water) was placed in a battery jar. A solution of 2,392 grams of zirconyl chloride ($ZrOCl_2 \cdot 8H_2O$) and 1,013 grams of uranyl chloride monohydrate ($UO_2Cl_2 \cdot H_2O$) in 13,800 ml of water was prepared. The resin was stirred with the solution for a period of 18 hours. The resin was filtered, washed free of chloride, and dried at 180°C. The dried material was separated and the product that passed through a 50-mesh screen was recovered. The resin at this point contained 4.10 percent uranium and 14.80 percent zirconium.

A total of 108 grams of the above material was placed in the Vycor reactor described in Example 1. Steam at the rate of 3.7 liters per minute and hydrogen at the rate of 1.5 liters per minute were passed through the resin bed. The bed was heated using the following cycle:

a. Heated to 400°C over a period of 45 minutes.
b. Temperature increased to 800°C over a period of 1 hour and 15 minutes.
c. Maintained at 800°C for 3 hours.

The hydrogen flow was discontinued and argon was fed through the resin bed at the rate of one-half liter per minute. The temperature was increased to 900°C over a period of 30 minutes and maintained at 900°C for 1 hour and 15 minutes.

A total of 34.7 grams of the material was recovered. The spheres had excellent sphericity with an average diameter of 50 microns. The analysis of the product was as follows: zirconium — 39.99 percent; uranium — 10.59 percent; carbon — 27 percent; and sulfur — 0.04 percent.

The carbon-to-metal mole ratio was 4.7. The carbon-to-metal ratio of the spheres initially was about 13. It is apparent from these data that the carbon-to-metal ratio can be decreased by more than 50 percent using our process.

EXAMPLE 3

This example illustrates conversion of resin spheres that have been pretreated to decrease the carbon content.

In this example, resin (Dowex 50 WX4) was loaded with a mixture of zirconium and uranium using the same technique as in Example 2, and was heat treated as in Example 2 with the exception that heating in a mixture of argon and steam was continued for 1 ½ hours at 900°C. The product recovered was excellent spheres having an average diameter of 50 microns. The analysis of the unsintered carbide-precursor spheres was as follows: zirconium — 40.50 percent; and sulfur — 0.03 percent. The carbon-to-metal mole ratio was 3.07. The spheres were heated in vacuum using the following cycle:

a. Temperature increased to 875°C over a period of 3 ½ hours.
b. Temperature increased to 1,100°C over a period of 45 minutes.
c. Temperature increased to 1,400°C over a period of 25 minutes.
d. Temperature increased to 1,800°C over a period of 1 ½ hours.
e. Temperature maintained at 1,800°C for a period of 1 hour.

The product was gray spheres in the 25 to 40 micron diameter size range. X-ray diffraction showed only zirconium carbide, indicating a single-phase zirconium carbide-uranium carbide solid solution. The chemical analysis of the product was as follows: zirconium — 63.5 percent; uranium — 17.45 percent; and carbon — 18.2 percent. This analysis corresponds to the formula $MC + 0.88C$ where $M = Zr + U$.

EXAMPLE 4

This example illustrates the importance of the control of the steam treatment as a tool in carbide preparation.

A sulfonic acid resin was loaded with a mixture of zirconium and uranium using the technique described in Example 2. The resin was transferred to the Vycor reactor and heated using the same cycle described in Example 2, with the exception that the heating in a mixture of steam and argon at 900°C was continued for 2 hours and 30 minutes. The particles were sintered using the sintering cycle described in Example 3.

The product recovered had a diameter of 20 to 50 microns. The chemical analysis was as follows: zirconium — 65.57 percent; uranium — 18.35 percent; and carbon — 15.2 percent. This analysis corresponds to the formula $MC + 0.60C$ where $M = Zr + U$.

X-ray diffraction patterns showed zirconium carbide, indicating a single-phase zirconium carbide, uranium carbide solid solution. This example illustrates that the amount of excess carbon can be reduced by continuing treatment of the dried resin spheres at 900°C for an additional period of 1 hour.

EXAMPLE 5

In this run zirconium oxide-uranium oxide spheres were prepared by completely removing the carbon from the spheres.

In this run a sulfonic acid cation exchange resin was loaded with a mixture of zirconium and uranium using the process described in Example 2. The spheres were washed, dried, and transferred to the Vycor reactor. The spheres were heated using the cycle described in Example 3, with the exception that the spheres were subjected to a mixture of steam and argon at 900°C for a period of 3 ½ hours. The spheres were then heated under argon using the following cycle:

a. To 875°C over a period of 3 ½ hours.

b. To 1,100°C over a period of 45 minutes.
c. To 1,400°C over a period of 25 minutes.
d. To 1,600°C over a period of 1 hour and 40 minutes.
e. Maintained at 1,600°C for 1 hour.

The furnace was cooled and the product recovered. The recovered product consisted of spheres in the 20 to 40 micron size range. The spheres were analyzed and found to contain 99.6 weight percent metal oxide. The x-ray diffraction showed the product to be a mixture of tetragonal and monoclinic $ZrO_2$, indicating that uranium was present as a solid solution.

What is claimed is:

1. A process for preparing metal carbide microspheres having a carbon to metal ratio of about 1:1 to 15 to 1 which comprises:
   a. exchanging anion exchange resin spheres or sulfur free cation exchange resin spheres with a solution of a soluble salt of a metal selected from the group consisting of the actinides, the rare earths and elements of group I$b$, II$b$, III$b$, IV$b$, V$b$, VI$b$ and VII$b$ of the periodic table,
   b. washing to remove excess solution and drying,
   c. heating the exchanged resin spheres at a temperature of 500° to 1100°C. in an atmosphere of steam, carbon dioxide or oxygen for a period of time sufficient to reduce the carbon to metal ratio to about 3:1 to 17:1,
   d. heating to a temperature of 1200°C to 1400°C. in argon for 3 to 6 hours to effect carbothermal reduction,
   e. sintering at a temperature of 1000° to 3000°C. for about 0.5 to 28 hours in hydrogen, an inert gas or under vacuum, and
   f. recovering the metal carbide microspheres product.

2. The process according to claim 1 wherein the spheres are exchanged with an aqueous chloride, nitrate, acetate, fluoride, perchlorate and sulfate solution.

3. A process for preparing metal carbide microspheres having carbon to metal ratios of from about 1:1 to 5:1 which comprises the steps of:
   a. exchanging sulfur containing cation exchange resins spheres with a solution of a soluble salt of a metal selected from the group consisting of the actinides, the rare earths and elements of Groups I$b$, II$b$, III$b$, IV$b$, V$b$, VI$b$, and VII$b$ of the periodic table,
   b. washing to remove excess solution and drying,
   c. heating the exchanged resin spheres to a temperature of 400°–800°C. in an atmosphere of Hydrogen and steam for a period of 4 to 8 hours to reduce the sulfur content of the spheres to less than 0.5 percent,
   d. heating said exchanged resin spheres to a temperature of 500°–1100°C. in an atmospheres of steam carbon dioxide or oxygen for a period sufficient to reduce the carbon-to-metal ratio to about 3:1 to 17:1,
   e. heating to a temperature of 1,200° to 1,400°C. in argon for 3–6 hours to effect carbothermal reduction,
   f. sintering at a temperature of 1,000° to 3,000°C. for about 0.5 to 28 hours in hydrogen, an inert gas, or under vaccum and
   g. recovering the metal carbide microspheres.

4. The process according to claim 3 wherein the spheres are exchanged with an aqueous chloride, nitrate, acetate, fluoride, perchloriate or sulfate solution.

5. A process for preparing metal oxide microspheres which comprises:
   a. exchanging anion exchange resin spheres or sulfur free cation exchange resin spheres with a solution of a soluble salt of a metal selected from the group consisting of the rare earths, the actinides, elements of Group I$b$, II$b$, III$b$, IV$b$, V$b$, VI$b$ and VII$b$.
   b. washing to remove excess solution and drying,
   c. heating the exchanged resin spheres at a temperature of 500° to 1100°C. in the pressure of steam, carbon dioxide or oxygen for a period of 3 to 8 hours to reduce the carbon-to-metal ratio to below about 0.5;
   d. sintering said microspheres to a temperature of 1,500° to 3,000°C. for 3 to 8 hours in argon or under vaccum and recovering the product microspheres.

6. The process according to claim 5 wherein the spheres are exchanged with an aqueous chloride, nitrate, acetate, fluoride, perchlorate, or sulfate solution.

7. A process for preparing metal oxide microspheres which comprises:
   a. exchanging the sulfur containing cation exchange resin spheres with a solution of a soluble salt of a metal selected from the group consisting of the rare earths, the actinides, elements of Group I$b$, II$b$, III$b$, IV$b$, V$b$, VI$b$ and VII$b$,
   b. washing to remove excess solution and drying,
   c. heating the exchanged resin spheres at a temperature of 500° to 1100°C. in the presence of steam, carbon dioxide or oxygen for a period of 3 to 8 hours to reduce the carbon-to-metal ratio to below about 0.5,
   d. sintering said microspheres to a temperature of 1,500° to 3,000°C. for 3 to 8 hours in argon or under vaccum and recovering the product microspheres.

8. The process according to claim 7 wherein the spheres are exchanged with an aqueous chloride, nitrate, acetate, fluoride, perchlorate or sulfate solution.

* * * * *